United States Patent [19]

Scalisi et al.

[11] Patent Number: 4,633,730

[45] Date of Patent: Jan. 6, 1987

[54] SHIFT RAIL Z-SHAPED INTERLOCKING LUG ARRANGEMENT

[75] Inventors: Joseph M. Scalisi; Peter Bzowycky, both of Liverpool, N.Y.

[73] Assignee: Chrysler Motors Corporation, Highland Park, Mich.

[21] Appl. No.: 779,741

[22] Filed: Sep. 24, 1985

[51] Int. Cl.⁴ .............................................. G05G 5/10
[52] U.S. Cl. ..................................................... 74/477
[58] Field of Search ........................... 74/477, 483 PB

[56] References Cited

U.S. PATENT DOCUMENTS 1,537,584  5/1925  Carhart .................. 74/477
3,104,558  9/1963  Herr, Jr. ................. 74/477

FOREIGN PATENT DOCUMENTS 56-85124  7/1981  Japan ..................... 74/477

Primary Examiner—Allan D. Herrmann
Attorney, Agent, or Firm—Edward P. Barthel

[57] ABSTRACT

A shift rail interlock arrangement for a manual transmission having a pair of outboard shift rails and a center shift rail arranged in a symmetrical manner on a circular arc with the center rail above the outboard rails. A pair of identical Z-shaped shift rail interlocking lugs are arranged in a mirror-image manner with each lug positioned intermediate the center rail and its associated outboard rail. The lugs are adapted for conjoint movement in a transverse vertical plane to insure travel of only one rail at a time during the shifting operation. A U-shaped slot is provided in the transmission case to cooperatively support the Z-shaped lugs such that the lugs are obviated from canting during their transverse reciprocal travel within the slot.

3 Claims, 8 Drawing Figures

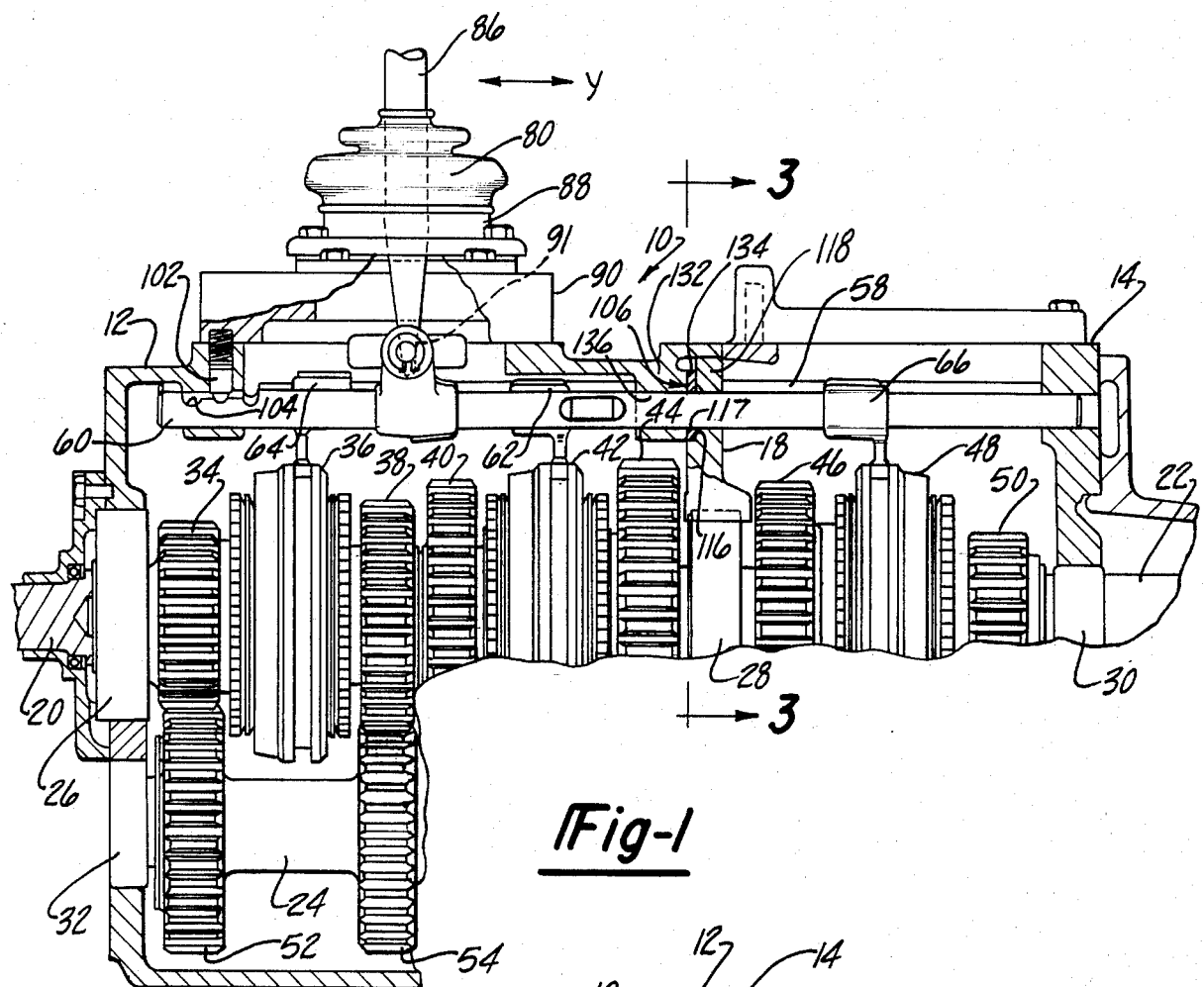

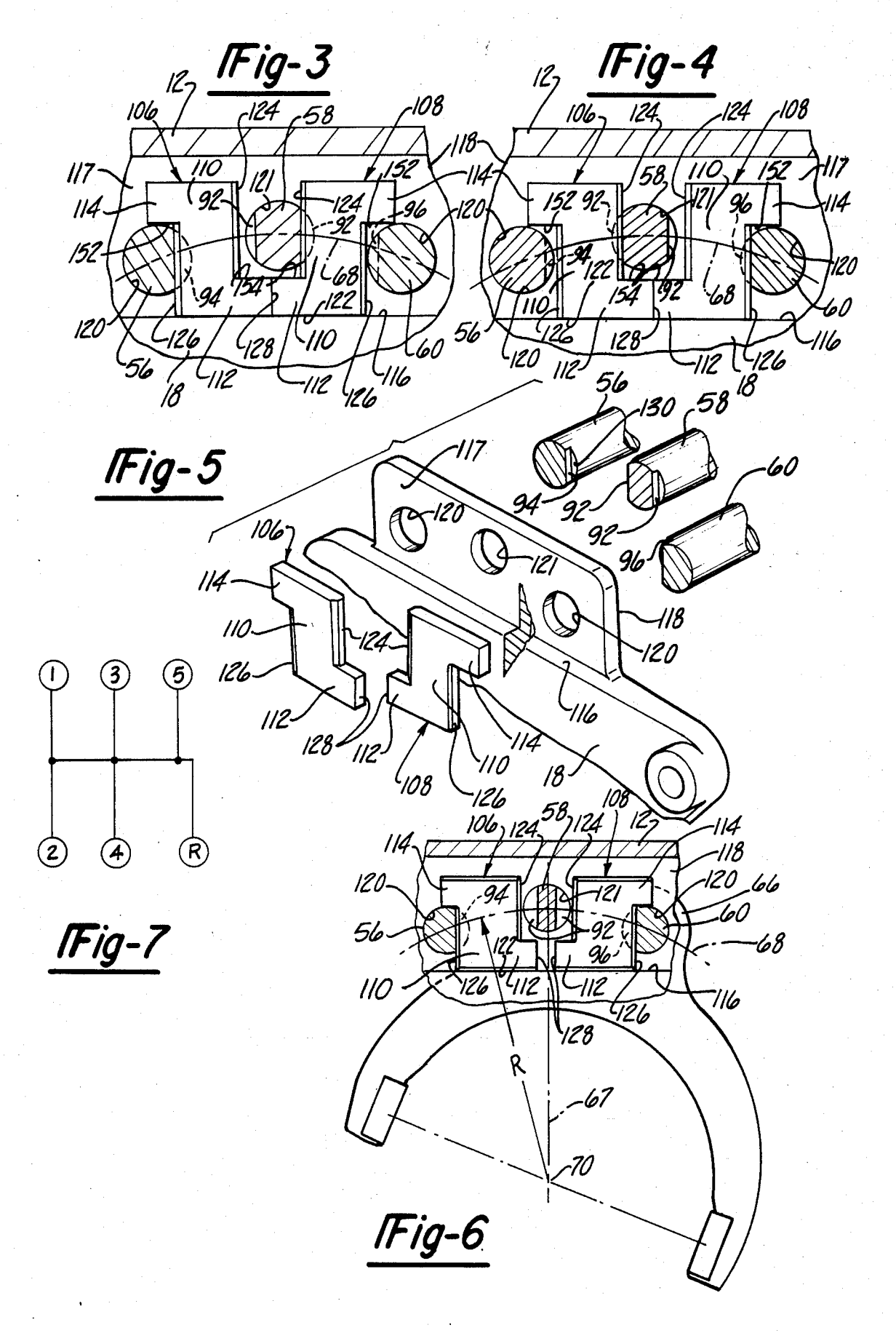

SHIFT RAIL Z-SHAPED INTERLOCKING LUG ARRANGEMENT

BACKGROUND OF THE INVENTION

This invention relates to manually operable change speed transmissions for motor vehicles and more particularly to a novel interlocking lug arrangement for the transmission shift rails.

In vehicles having manual change speed transmissions, wherein gears are shiftable by axially reciprocable shift rails, there is a need to prevent the shiftable gears from being accidentally moved out of their preselected positions. To prevent accidental shifting various types of interlock and detent mechanisms have been suggested. The U.S. Pat. Nos. 1,537,584 to Carhart and 3,104,558 to Herr, Jr. are examples of prior art interlock plate-like lug devices which hold a pair of sliding rails in neutral while a third rail is being shifted or is in gear. These mechanisms, however, have not been entirely satisfactory from the standpoint of reliability, simplicity of construction and cost of manufacture.

SUMMARY OF THE INVENTION

The present invention meets all the requirement of an interlocking system for a three shift rail manual transmission, but has decided advantages over the existing designs such as disclosed in the above-mentioned patents. A pair of plate-like interlocking lugs are provided which are identical in design having a generally Z-shape configuration. It is a feature of the invention that the pair of lugs are arranged in a symmetrical interlocking manner with a manual transmission pair of outboard shift rails and a center shift rail disposed in parallel longitudinally extending relation. The Z-shaped lugs are adapted to selectively engage the three shift rails such that the transmission is restricted from being in more than one gear at a time. The lugs are slidably supported in a horizontally disposed transversely extending U-shaped slot to hold two of the shift rails in neutral while the remaining shift rail is free to be moved in either a fore or aft direction.

It is another feature of the present invention to provide a pair of identical Z-shaped interlocking lugs as set forth above which are slidably supported in a U-shaped slot defined by a transverse bearing plate having a stepped-ledge formed therein defining a horizontally disposed tread surface and a vertically disposed riser surface. The stepped-ledge is closed by a juxtaposed transmission case wall, which with the riser surface, defines the parallel sides of the U-shaped slot. The U-shaped slot slidably receives the Z-shaped lugs without the requirement of any exterior to interior machining operation thus obviating close tolerance production problems.

Still another feature of the present invention is to provide a pair of Z-shaped interlocking lugs as set forth above which are symmetrical so as to eliminate special handling during assembly while being readily serviceable.

A further advantage of the present invention is to provide a pair of Z-shaped shift rail interlocking lugs as set forth above in which the three shift rails are arranged with their principal axis spaced in a symmetrical equally spaced manner on the arc of a circle with the center rail axis positioned at the zenith of the arc such that identical shift forks may be used interchangeably on each of the three shift rails.

DESCRIPTION OF THE DRAWINGS

These and other features and advantages of this invention will become readily apparent from a reading of the following description and a consideration of the detailed drawings wherein:

FIG. 1 is a longitudinal fragmentary side sectional view, partly in elevation, showing a transmission mechanism in which a shift interlock system according to the present invention is incorporated;

FIG. 2 is a top elevational fragmentary view, with parts broken away, of the transmission of FIG. 1;

FIG. 3 is an enlarged fragmentary sectional view, taken substantially on the line 3—3 of FIG. 1, of Z-shaped locking lugs with an outside rail shown in a shifted position;

FIG. 4 is a view similar to FIG. 3 with the other outside rail shown in a shifted position;

FIG. 5 is an exploded fragmentary view of the shift rails and Z-shaped locking lugs of the invention;

FIG. 6 is an enlarged fragmentary sectional view showing the shift rails in their third/fourth speed positions together with the rearmost fork;

FIG. 7 is a diagrammatic outline depicting the shift pattern through which the shift lever of FIG. 1 may be moved.

DESCRIPTION OF THE PREFERRED EMBODIMENT

Figure 8:
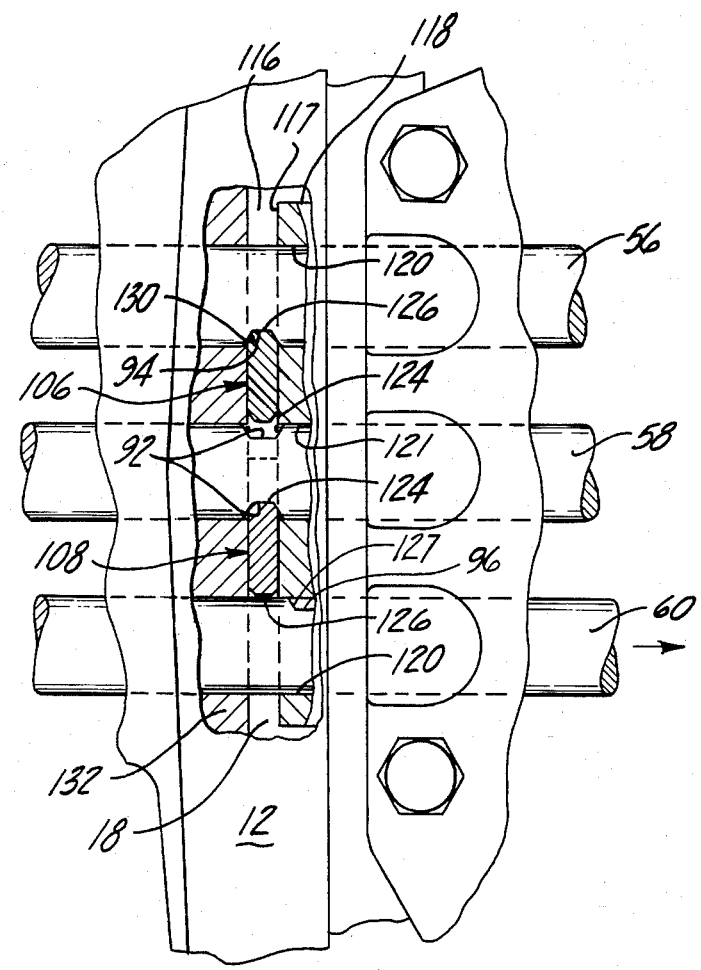
FIG. 8 is an enlarged fragmentary top elevational view of FIG. 3 with parts broken away and parts in section, showing outboard rail 60 shifted in an aft direction.

With reference to the drawings, FIG. 1 shows a portion of a manually operated transmission generally indicated at 10. The transmission includes a gear train of five forward movements and one reverse movement. The transmission has case means comprising a forward case portion 12 and an aft case portion 14 disposed in end to end relation suitably secured as by bolts 16 shown in FIG. 2. A vertically disposed transversely extending midship bearing plate 18 is shown supported at the juncture of the forward and aft case portions 12 and 14. The forward case portion 12 supports thereon an input shaft 20, an output shaft 22 and a counter shaft 24 comprising a gear train. The input and output shafts are located coaxially and journaled by suitable bearings 26, 28 and 30. The counter shaft 24 is located parallel to the input and output shafts and journaled by bearings such as front bearing 32.

The output shaft 20 is formed at its one end with a fourth-speed gear 34. A first synchronizer device 36 is positioned on the output shaft 22 intermediate the fourth-speed gear 34 and a third-speed gear 38. The third-speed gear 38 is located adjacent a second-speed gear 40. A second synchronizer device 42 is located intermediate the second-speed gear 40 and a first-speed gear 44. A reverse gear 46 is located adjacent the first-speed gear with output shaft bearing means 28 disposed therebetween. A third synchronizer device 48 is located intermediate the reverse gear 46 and a fifth-speed gear or overdrive gear 50. The counter shaft 24 has counter gears, only two of which are shown at 52 and 54, mounted thereon in meshing engagement with the five speed-gears 34, 38, 40, 44, and 50 and the reverse gear 46.

FIGS. 1 and 2 show a shift control having three parallelly arranged, relatively shiftable, shift rods or rails 56, 58 and 60. The longitudinally extending shift rails are slidably supported in bores formed in the forward and aft case portions and the midship bearing plate 18. Each of the shift rails 56, 58 and 60 have pinned thereon identical shifter forks 62, 64 and 66, respectively. The forward fork 64 on center rail 58 is engaged with the shiftable third and fourth speed gear synchronizer device 36, while the fork 62 on first outboard rail 56 is engaged with the shiftable synchronizer device 42. The rearmost fork 66 is engaged with the shiftable synchronizer device 48.

The shift rails, mounted for axial sliding reciprocal movement, are disposed in a symmetrical arcuate arrangement. Thus, the center rail 58 has its principal axis aligned in a vertically extending longitudinal plane of symmetry indicated by construction line 67. As seen in FIG. 6 the centers of the shift rails are arranged on the arc of a circle shown in phantom at 68 having a radius "R" with its center shown at 70. Each rail 56, 58 and 60 is shiftable axially in opposite fore and aft directions from a neutral position to select either one of two alternate gears of the transmission. The first outboard rail rail 56 carries a first/second speed gear selector lug 72, the center rail 58 carries a third/fourth speed gear selector lug 74, and the second outboard rail 60 carries a reverse/fifth speed gear selector lug 76. As seen in FIG. 2 the selector lug 76 has a transverse bore 78 in which is arranged a spring loaded plunger 80. The plunger includes a guide detent 82 on its inner end which travels in a guide slot 84 on the lug 76.

FIG. 1 shows a speed change lever 86 having an intermediate spherical portion (not shown) engagably supported by means of a spring in a spherical seat provided in an upper collar 88 bolted on upper housing block 90. As seen in FIG. 1 the lower end of the speed change lever 86 terminates in a depending finger 91. The finger 91 normally is aligned on a vertical axis for engagement with a notch in the lug 74 as shown in phantom in FIG. 2. The plunger 80 can be tilted about the spherical seat when the speed change lever 86 is moved in a longitudinal direction indicated by the arrow Y. The finger 91 can also be tilted a second transverse direction, at a right angle to the arrow Y when the speed change lever is moved in the second direction. The finger 91 may thus occupy either of two transverse positions relative to the central position engaging lug 74. In its dashed line position 91' of FIG. 2, the finger engages a notch in the lug 72 and on it dashed line position 91" the finger engages the lug 76 after depressing the plunger 80 to an outward position.

The mode of selecting the speed-gear rail is changed by rocking the lever 86 in the transverse direction, i.e., at a right angle to the arrow Y. The mode of meshing each set of speed change gears 34-38, 40-44 or 46-50 is changed by rocking the lever 86 in a longitudinal direction indicated by the arrow Y.

The shift rail interlock system of the present invention will now be described. The interlock system is a safeguard to prevent the transmission from being in more than one speed-gear at a time. That is, the locking system "holds" two of the three sliding clutches 36, 42 and 48 in neutral while the remaining sliding clutch is being shifted or is in gear. As seen in FIGS. 2 and 6, the middle rail 58 has a pair of opposed shallow V-shaped notches or 92 formed therein. Each of the side rails 56 and 60 have a single V-shaped notch or recess 94 and 96, respectively each formed therein to face in opposed outboard directions.

In the neutral position of FIG. 2 all the recesses 92, 94 and 96 are aligned in a common transverse plane. The three shift rails are located by spring loaded plungers 98, 100 and 102. In their neutral conditions shown in FIGS. 1 and 2, each plunger is engaged with its associated intermediate groove of a set of three aligned grooves formed in each rail. For example, in FIG. 1, plunger 102 is engaged with the neutral groove of its set of shift rail grooves 104.

As best seen in FIGS. 3-6 the locking lugs of the present invention are shown in the form of two mirror image first and second plate-like lugs indicated generally at 106 and 108. As the lugs 106 and 108 are identical the same numbers will be used to describe the same or corresponding parts. The lugs are generally Z-shaped wherein each lug having a vertically disposed body portion 110 with a lower inboard or inwardly directed toe portion 112 and upper outboard or outwardly directed toe portion 114.

As seen in FIG. 1, the lugs 106 and 108 are slidably supported in a transversely extending U-shaped slot. The U-shaped slot is partly defined in the bearing plate 18 by a stepped-ledge formed with a horizontally disposed tread surface 116, and a vertically disposed riser surface 117 formed by bearing plate upright flange 118 as shown in FIG. 5.

The upstanding guide flange 118 is formed with three equally spaced bores or holes having their centers symmetrically aligned on an arc 68 of the predetermined radius R (FIG. 6). The outboard bores 120 have their centers in a common horizontal plane while the central bore 121 has its center located a determined distance above the centers of the outboard bores 120. Each bore is sized to slidably receive its associated longitudinally extending rails 56, 58 or 60 for reciprocal travel therein. It will be noted that the center 70 of the arc 68 coincides with the principal axis of the output shaft 22.

FIG. 6 shows the locking lugs 106 and 108 in their neutral position of FIG. 2 wherein the recesses 92, 94 and 96 of the shift rails are aligned in a common transverse plane with their bottom edges 122 supported on horizontal ledge 116. The first lug 106 is shown shifted outboard from center rail 58 such that its inboard or inwardly facing vertical edge 124 clears its associated center rail recess 92. In this mode the first lug 116 has its outboard or outwardly facing vertical edge 126 in engagement with the recess 94 of the first outboard rail 56. In a corresponding manner, the second lug 108 is shown shifted outboard from center rail 58 such that its inboard vertical edge 124 clears its associated center rail recess 92 while its outboard vertical edge 126 is in engagement with recess 96 of outboard rail 60. In this FIG. 6 mode the third/fourth speed-gear center rail 58 is free to be moved longitudinally by the shift lever 86.

FIG. 3 shows the interlocking lugs 106 and 108 in their first outboard rail 56 and center rail 58 locking positions wherein second outboard rail 60 has been shifted in an aft direction. Upon the rail 60 being shifted a chamferred cam edge 127 shown in FIG. 8 of its recess 96 slides the second lug 108 on its bottom edge 122 such that its vertical edge 124 is placed into locking engagement with its associated rail recess 92. Further, the second lug 108 inboard toe vertical edge 128 is shifted into abutting contact with the first lug 106 opposed toe vertical edge 128 forcing lug 106 vertical edge 126 into recess 94 of rail 56. Also vertical edge 124 of lug 108 moves into recess 92 of rail 58, thereby locking the rails 56 and 58 in their neutral positions.

FIG. 4 shows the interlocking lugs 106 and 108 in their center rail 58 and second outboard rail 60 locking positions wherein first outboard rail 56 has been shifted by lever 86 in an aft direction. As a result of rail 56 being shifted a chamferred edge 130 of its recess 94 slides the first lug 106 inboard such that its vertical edge 124 is placed into locking engagement with its associated center rail recess 92. Further, by virtue of lug 106 inboard edge 128 being in abutment with the lug 108 inboard edge 128, the lug 108 is shifted outboard wherein its outboard vertical edge 126 is moved into locking engagement with the recess 96 of rail 60.

It will be seen in FIG. 1 that the cross member 132 of the forward case portion has a vertically extending transverse surface 134 positioned to define the transverse U-shaped slot along with the stepped-ledge tread surface 116 and associated riser surface 117 formed in bearing plate 18. It will be noted that the surfaces 134 and 117 are spaced a sufficient longitudinal distance greater than the thickness of the lugs to allow for limited axial play within the U-shaped interlocking lug slot while mantaining the lugs in coplanar relation during their conjoint travel. Thus, the U-shaped slot is provided without requiring close tolerance machining of the opposed surfaces 134 and 117. It will be understood that the cross member 132 is formed with three bores or holes having their respective axis alligned coaxially with a respective first or second outboard bore 120 or center bore 121 in guide flange 118. Thus, for example, bore 136 in crossmember 132 is aligned with second outboard bore 120 to slidably receive rail 60 therein.

As seen in FIGS. 3 and 4 the lugs outwardly extending upper toe portions 114 have horizontally disposed downwardly facing edges 152 located juxtaposed the upper periphery of their associated outboard rails 56 and 60. In a like manner, the inwardly extending lower toe portions 112 each have horizontally disposed upwardly facing edges 154 located closely adjacent the lower periphery of the center rail 58. By virtue of this interengaging toe portion arrangement, the lugs are maintained in their upright coplanar positions shown obviating any canting of the lugs during their transverse reciprocal travel within the U-shaped slot.

Although only one embodiment of the invention has been disclosed and described, it is apparent that other embodiments and modifications of the invention are possible.

What is claimed is:

1. An interlocking mechanism for a pair of first and second outboard shift rails and a center shift rail wherein the rails extending longitudinally of a change speed gear transmission, said transmission including case means having transverse support means formed with three equal diameter bores arranged in a equally spaced symmetrical manner with respect to a longitudinally extending vertically disposed plane, said three bores defining a central bore and a pair of outboard bores, each said rail sized to extend through an associated one of said bores for reciprocal axial travel therein, said interlocking mechanism comprising:

a pair of first and second plate-like, Z-shaped identical interlocking lugs having upper and lower horizontally disposed edges;

means for supporting each lug of said pair of lugs being arranged in a mirror-image manner on either side of said center shift rail for sliding movement of their respective lower edges in a transverse vertical plane;

each said Z-shaped lug comprising a vertically disposed rectangularly shaped body portion having inwardly and outwardly facing vertical edges, each said Z-shaped lug formed with an outwardly extending toe portion on its upper end and an inwardly extending toe portion on its lower end, each said lug lower inwardly extending toe terminating in a vertical disposed inwardly facing edge;

said first lug body portion disposed intermediate said center rail and said first outboard rail such that its upper outwardly extending toe portion is positioned above said first outboard rail, said first lug upper toe portion having a horizontally disposed downwardly facing edge located closely adjacent the upper periphery of said first outboard rail;

said first lug lower inwardly extending toe portion positioned below said center rail, said first lug lower inwardly extending toe portion having a horizontally disposed upwardly facing edge located closely adjacent the lower periphery of said center rail;

said second lug upper outwardly extending toe portion and lower inwardly extending toe portion being disposed in an identical mirror-image manner as said first lug toe portions relative to said center rail and said second outboard rail;

each said outboard rail having an inboard facing recess and said center rail having a pair of opposed outboard facing recesses;

whereby with said rails positioned in one mode their associated recesses being disposed in a common transverse plane with each said first and second lug having its body portion outwardly facing vertical edge in locking engagement with its associated outboard rail recess, and each said first and second lug having its body portion inwardly vertical edge located closely adjacent said center rail;

whereby upon said first outboard rail being shifted axially its recess being operative to cam said first lug a predetermined distance toward said center rail causing its body portion outboard vertical edge to be moved into locking engagement with its associated center rail recess, and whereby said first lug lower toe portion vertical edge contacting said second lug lower toe vertical edge causing said second lug body outboard vertical edge portion to be moved into locking engagement with said second outboard rail recess;

and whereby upon said second outboard rail being shifted axially its recess being operative to cam said second lug toward said center rail causing the said second lug body portion inwardly facing vertical edge to be moved into locking engagement with its associated center rail recess, and whereby said second lug inwardly extending lower toe portion vertical edge contacting said first lug inwardly extending lower toe portion vertical edge causing said first lug body portion outwardly facing vertical edge to be moved into locking engagement with said first outboard rail recess.

2. The interlocking mechanism as set forth in claim 1, wherein said supporting means being a transversely extending U-shaped slot in said case means, said U-shaped slot in the form of a transverse bearing plate having a stepped ledge formed therein defining a horizontally disposed tread surface and a vertically disposed riser surface, said riser surface having said central bore and said pair of outboard bores extending therethrough, said case means further including a cross member defining a vertically extending, transverse guide surface, said guide surface disposed in longitudinally spaced relation with said riser surface defining with said tread surface said U-shaped slot receiving said Z-shaped lugs therein for supporting said lugs in a coplanar manner during their transverse reciprocal travel within said U-shaped slot.

3. An interlocking mechanism for a pair of first and second outboard shift rails and a center shift rail wherein the rails extending longitudinally of a change speed gear transmission, said transmission including case means having transverse vertically extending support flange formed with three equal diameter bores arranged in an equally spaced symmetrical manner with respect to a longitudinally extending vertically disposed plane, said three bores having their centers aligned on a circular arc defining a central bore and a pair of outboard bores, said central bore having its center bore located above the centers of said pair of outboard bores, each said rail sized to extend through an associated one of said bores for reciprocal axial travel therein, said interlocking mechanism comprising:

a pair of first and second plate-like, Z-shaped identical interlocking lugs;

each Z-shaped lug of said pair of lugs being arranged in a mirror-image manner on either side of said center shift rail with its bottom edge positioned for sliding movement on a horizontally disposed ledge of said case means in a transverse vertically disposed plane;

each said Z-shaped lug comprising a vertically disposed rectangularly shaped body portion formed with an outwardly extending toe portion on its upper end and an inwardly extending toe portion on its lower end, each said lug lower inwardly extending toe portion terminating in a vertical disposed inwardly directed edge;

said first lug body portion disposed intermediate said center rail and said first outboard rail such that its upper outwardly extending toe portion is positioned above said first outboard rail, said upper toe portion having a horizontally disposed downwardly facing edge located juxtaposed the upper periphery of said first outboard rail;

said first lug lower inwardly extending toe portion positioned below said center rail, said lower inwardly extending toe portion having a horizontally disposed upwardly facing edge located closely adjacent the lower periphery of said center rail;

said second lug upper outwardly extending toe portion and lower inwardly extending toe portion being disposed in an identical mirror-image manner relative to said center rail and said second outboard rail;

each said outboard rail having an inboard facing recess and said center rail having a pair of opposed outboard facing recesses;

whereby with said rails positioned in their neutral mode their associated recesses being disposed in a common transverse plane with each said first and second lug having its body portion outboard vertical edge in locking engagement with its associated outboard rail recess, and each said first and second lug having its body portion inboard vertical edge spaced from said center rail;

whereby upon said first outboard rail being shifted axially its recess being operative to cam said first lug a predetermined distance toward said center rail causing its body portion outboard vertical edge to be moved into locking engagement with its associated center rail recess, and whereby said first lug lower toe portion vertical edge contacting said second lug lower toe vertical edge causing said second lug body outboard vertical edge portion to be moved into locking engagement with said second outboard rail recess;

and whereby upon said second outboard rail being shifted axially its recess being operative to cam said second lug toward said center rail causing the inner vertical edge of said second lug body portion to be moved into locking engagement with its associated center rail recess, and whereby said second lug lower inwardly extending toe portion vertical edge contacting said first lug lower inwardly extending toe portion vertical edge causing the outboard vertical edge of said first lug body portion to be moved into locking engagement with said first outboard rail recess.

* * * * *